Aug. 26, 1930.  A. H. GARST  1,774,434
CLIP FOR TUBULAR SHELLS
Filed Oct. 17, 1929
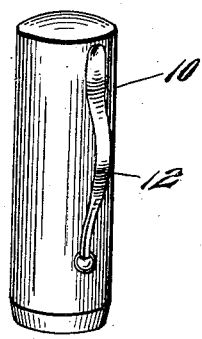
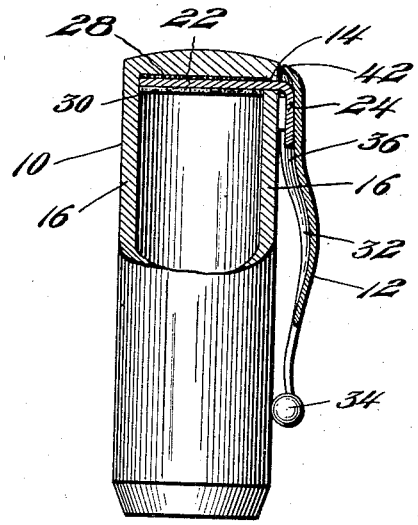
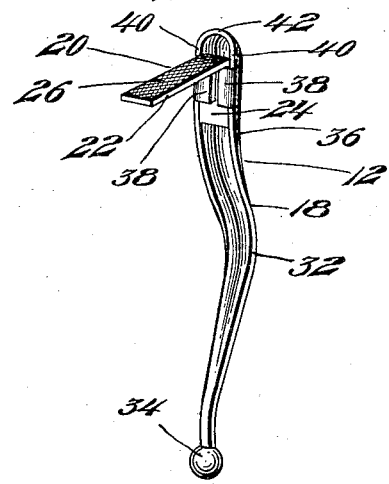
Inventor
Arthur H. Garst
By Thomas A. Jenkins Jr.
Attorney Patented Aug. 26, 1930

1,774,434

UNITED STATES PATENT OFFICE

ARTHUR H. GARST, OF PROVIDENCE, RHODE ISLAND

CLIP FOR TUBULAR SHELLS

Application filed October 17, 1929. Serial No. 400,398.

My invention relates to clips for tubular shells such as the clips of fountain pens or the barrels of mechanical pencils, etc.

An object of my invention is to provide a clip of this description which may be readily attached to the tubular shell through a single transverse slot in the wall thereof.

A further object of my invention is to provide a clip of this description which will completely conceal when viewed from the outside of the shell its means of attachment to the shell.

A further object of my invention is to provide a clip of this description which functions in its clamping action as a lever of the first class having a pivot point spaced from an end thereof thus making its clamping action not entirely one of bending the metal of the clip as has been the case formerly.

A further object of my invention relates to the provision of a clip which is relatively easy to construct, cheap and simple to manufacture.

A further object of my invention is to provide a clip for tubular shells, which may be readily and firmly attached to said shell without the use of rivets, retaining bands, etc.

These and such other objects of my invention as may hereinafter appear will be best understood from a description of an embodiment thereof shown in the accompanying drawings attached to a fountain pen clip.

In the drawings, Fig. 1 is a perspective view of a fountain pen cap with my improved clip attached.

Fig. 2 is an enlarged sectional view of said cap with the upper portion of the clip broken away and shown in section.

Fig. 3 is a perspective view of my improved clip.

In the drawings, wherein like characters of reference indicate like parts throughout, 10 generally indicates a tubular shell to which it is desired to attach the clip 12, the specific embodiment of tubular shell 10 shown consisting of a fountain pen clip, although it is obvious that other types of tubular shells may be employed, such as the barrels of mechanical pencils, etc. The tubular shell 10 is provided with a transverse slot 14, in the embodiment shown, preferably near the top of the wall 16 thereof.

As shown in Fig. 3 the clip 12 itself comprises two members, namely, the lever member 18 and the retaining bar 20. The retaining bar 20 is preferably constructed flat and is preferably of an L shape having a flat arm 22 of approximately the width and size of said slot 14 and thereby secured within said tubular shell in a manner to be explained and an arm 24 substantially parallel to the wall of said shell. The arms 22 and 24 are bent relative to each other preferably at right angles to each other and the arm 22 is preferably longer than the arm 24. The arm 22 is adapted to be secured within the interior of the tubular member 10 in any desired fashion. If desired, as shown, both surfaces thereof are preferably roughened as at 26, so that cement may more readily adhere to them and said arm 22 is firmly secured to the lower surface of the top 28 of the cap by the cement 30, although it is obvious that if desired after insertion through the slot 14 said arm 22 may be bent downward over the wall 16 to firmly clamp said retaining bar thereto. The lever member 18 is similar in general configuration to the usual type of lever member employed, is preferably curved as at 32 to provide space for the thickness of the cloth of the pocket of the wearer or other article to which it is desired to clip the shell, is preferably provided with the clamping ball 34 at the lower end thereof and with the hemi-tubular upper end 36. The lugs 38 preferably project integrally from each edge 40 of the preferably hemi-tubular upper end 36 and are preferably spaced from the top thereof. After the arm 24 of the retaining bar is inserted within the hemi-tubular upper end 36 of said lever member, said lugs 38 are preferably bent at right angles to each other to firmly embrace the arm 24 of said retaining bar within the hemi-tubular portion 36 of said lever. It is obvious, however, that if the upper end 36 be constructed flat, said lugs 38 will nevertheless firmly clamp said arm 24 thereto. As stated, the lugs 38 are preferably spaced from the top 42 of said lever member, thus making the lever member into a lever of the first class having its pivot point the upper end of the bar 24 and permitting a portion of its pivoting motion to take place through the medium of the resiliency of the arm 22 and the lugs 38 rather than depending for the entire gripping action upon the resiliency of the lever member itself.

It is thus obvious that I have provided a novel means for attaching a clip to a shell through a single transverse slot in the wall thereof and a lever type of clip with the advantages portrayed above.

It is understood that my invention is not limited to the specific embodiment shown and that various deviations may be made therefrom without departing from the spirit and scope of the appended claims.

What I claim is:

1. In combination, a tubular shell having a transverse slot in the wall thereof, a flat L-shaped retaining bar having an arm of approximately the size of said slot projecting through said slot and secured within said tubular member and an arm substantially parallel to the wall of said shell and a curved lever member having a clamping ball at the lower end thereof and a hemi-tubular upper end having lugs projecting integrally from each edge thereof spaced from the top thereof bent to embrace the free arm of said retaining bar within the hemi-tubular upper portion of said lever.

2. In combination, a tubular shell having a transverse slot in the wall thereof, a flat L-shaped retaining bar having an arm of approximately the size of said slot projecting through said slot and secured within said tubular member and an arm substantially parallel to the wall of said shell and a curved lever member having a clamping lower end and a hemi-tubular upper end having lugs projecting integrally from each edge thereof spaced from the top thereof bent to embrace the free arm of said retaining bar within the hemi-tubular upper portion of said lever.

3. A clip for tubular shells, comprising a flat retaining bar having two arms bent at right angles to each other and a curved lever member having a clamping ball at the lower end thereof and a hemi-tubular upper end having lugs projecting integrally from each edge thereof spaced from the top thereof bent to embrace an arm of said retaining bar within the hemi-tubular upper portion of said lever.

4. A clip for tubular shells, comprising a retaining bar having two arms bent relative to each other and a lever member having a clamping lower end and an upper end having lugs projecting integrally from each edge thereof bent to attach an arm of said retaining bar to the upper portion of said lever.

5. A clip for tubular shells comprising a flat retaining bar having two arms bent at right angles to each other and a lever member having a clamping lower end and an upper end having lugs projecting integrally from each edge thereof spaced from the top thereof bent to attach an arm of said retaining bar to the upper portion of said lever.

6. A clip for tubular shells, comprising a retaining bar having two arms bent relative to each other and a curved lever member having a clamping lower end and an upper end having lugs projecting integrally from each edge thereof spaced from the top thereof bent to attach an arm of said retaining bar to the upper portion of said lever.

7. A clip for tubular shells, comprising a retaining bar having two arms bent relatively to each other and a lever member having a clamping lower end and a hemi-tubular upper end having lugs projecting integrally from each edge thereof spaced from the top thereof bent to embrace an arm of said retaining bar within the hemi-tubular upper portion of said lever.

In testimony whereof I affix my signature.

ARTHUR H. GARST.